US011366886B2

(12) United States Patent
Jain et al.

(10) Patent No.: US 11,366,886 B2
(45) Date of Patent: Jun. 21, 2022

(54) AUTHENTICATING USERS OF COMMUNAL COMPUTING DEVICES USING A LIMITED SEARCH SCOPE

(71) Applicant: MICROSOFT TECHNOLOGY LICENSING, LLC, Redmond, WA (US)

(72) Inventors: Raju Jain, Kirkland, WA (US); Peter Gregory Davis, Kirkland, WA (US); Jeffrey Johnson, Bellevue, WA (US); Craig Thomas McIntyre, Kirkland, WA (US); Kiran Kumar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 477 days.

(21) Appl. No.: 16/156,780

(22) Filed: Oct. 10, 2018

(65) Prior Publication Data
US 2020/0117779 A1 Apr. 16, 2020

(51) Int. Cl.
*G06F 21/32* (2013.01)
*G06F 16/9535* (2019.01)

(52) U.S. Cl.
CPC .......... *G06F 21/32* (2013.01); *G06F 16/9535* (2019.01)

(58) Field of Classification Search
CPC ...... G06F 21/32; G06F 16/9535; G06F 21/34; G06F 2221/2111; A61B 5/1172;
(Continued)

(56) References Cited

U.S. PATENT DOCUMENTS 8,218,829 B2 7/2012 Kenoyer
9,292,840 B1 3/2016 Velline et al.
(Continued)

FOREIGN PATENT DOCUMENTS

EP 2869528 A1 5/2015
WO WO-2016151193 A1 * 9/2016 .......... H04W 12/065
(Continued)

OTHER PUBLICATIONS

"International Search Report and Written Opinion Issued in PCT Application No. PCT/US19/052528", dated Nov. 12, 2019, 12 Pages.
(Continued)

*Primary Examiner* — Matthew Smithers
*Assistant Examiner* — Shu Chun Gao
(74) *Attorney, Agent, or Firm* — Newport IP, LLC; Leonard J. Hope

(57) ABSTRACT

A user provides an identification (ID) signal (e.g. a biometric ID signal like a self-snapshot) to a trusted cloud-based provider. When the user attempts to authenticate with the cloud-based provider, a similar ID signal (e.g. another self-snapshot) for the user is captured and provided to the cloud-based provider. The cloud-based provider then obtains a secondary ID signal, or a combination of secondary ID signals, and utilizes the secondary ID signal, or signals, to identify a subset of user records to be searched for the ID signal. The subset of the records, rather than all of the user records, can then be searched for the ID signal. The cloud-based provider can then authenticate the user based on the results of the search of the subset of the user records.

20 Claims, 7 Drawing Sheets

(58) Field of Classification Search
CPC ............. A61B 5/1176; H04W 12/06; H04W 12/00503; H04W 88/02; H04L 63/0853; H04L 63/0861; H04L 63/107
See application file for complete search history.

(56) References Cited

U.S. PATENT DOCUMENTS

| | | |
|---|---|---|
| 2009/0094681 A1 | 4/2009 | Sadler et al. |
| 2014/0109210 A1* | 4/2014 | Borzycki ............. G06F 21/35 726/7 |
| 2014/0165152 A1 | 6/2014 | Farouki |
| 2014/0370879 A1 | 12/2014 | Redding et al. |
| 2015/0161370 A1 | 6/2015 | North et al. |
| 2016/0057124 A1 | 2/2016 | Boyle et al. |
| 2016/0205094 A1 | 7/2016 | Harthattu et al. |
| 2017/0195307 A1 | 7/2017 | Jones-Mcfadden et al. |
| 2017/0195339 A1* | 7/2017 | Brown ............... H04L 63/107 |
| 2017/0374070 A1 | 12/2017 | Shah et al. |
| 2018/0007060 A1 | 1/2018 | Leblang et al. |
| 2018/0084428 A1 | 3/2018 | Boyle et al. |
| 2019/0222570 A1 | 7/2019 | Krishan |
| 2020/0120088 A1 | 4/2020 | Jain et al. |
| 2020/0120094 A1 | 4/2020 | Jain et al. |
| 2020/0267144 A1 | 8/2020 | Wagner et al. |
| 2021/0027295 A1 | 1/2021 | Raquepaw et al. |

FOREIGN PATENT DOCUMENTS

| | | |
|---|---|---|
| WO | 2017031504 A1 | 2/2017 |
| WO | 2018004935 A1 | 1/2018 |
| WO | 2018126177 A1 | 7/2018 |

OTHER PUBLICATIONS

"International Search Report and Written Opinion Issued in PCT Patent Application No. PCT/US19/052529", dated Nov. 13, 2019, 14 Pages.

"International Search Report and Written Opinion Issued in PCT Patent Application No. PCT/US19/053328", dated Nov. 15, 2019, 15 Pages.

"Non Final Office Action Issued in U.S. Appl. No. 16/156,588", dated Jun. 24, 2020, 16 Pages.

"Notice of Allowance Issued in U.S. Appl. No. 16/156,588", dated Sep. 23, 2020, 16 Pages.

"Non-Final Office Action Issued in U.S. Appl. No. 16/156,496", dated Dec. 7, 2021, 9 Pages.

"Notice of Allowance Issued in U.S. Appl. No. 16/156,496", dated Mar. 23, 2022, 5 Pages.

* cited by examiner

AUTHENTICATING USERS OF COMMUNAL COMPUTING DEVICES USING A LIMITED SEARCH SCOPE

BACKGROUND

Communal computing devices are devices that are used by multiple users, sometimes simultaneously. Communal computing devices include, but are not limited to, interactive digital whiteboards, smart televisions, and public kiosks.

Users of communal computing devices commonly utilize personal content, such as a user's own documents or other types of personal files. However, authenticating users of communal devices to enable access to their own content involves technical challenges that are different from those typically associated with authenticating users on single user devices, such as smartphones, laptops, or desktop computers. These technical challenges primarily stem from the fact that communal devices can be shared with many other users, sometimes simultaneously.

Traditional password authentication can be utilized to authenticate users of communal computing devices. However, passwords can be insecure and can be cumbersome for users to enter on communal computing devices that are not equipped with a physical keyboard. It might also be insecure and awkward for users to enter passwords when in front of other users, such as on a large screen communal computing device or a communal computing device in a public location.

Biometric authentication, such as face recognition, fingerprint recognition, and speech recognition, is commonly utilized on communal computing devices as an alternative to password authentication. As compared to password authentication, biometric authentication can sometimes provide a more secure and convenient way to authenticate users on communal computing devices.

Biometric authentication, however, has its own set of technical challenges. In particular, biometric authentication is typically based on statistical models that measure a false acceptance rate (FAR) (i.e. an un-authorized person being authorized) and a false rejection rate (FRR) (i.e. an authorized person being rejected). FRR and FAR rates ideally do not exceed one false rejection or acceptance per 100,000 access attempts. This bar cannot be met, however, by some current biometric authentication technologies. This might not be a problem in environments, such as a home, where only a small number of users share a communal computing device, such as a smart television. However, when these types of biometric authentication technologies are utilized in organizations having a large number of users (e.g. an enterprise organization with 100,000 users or more), there is a much greater possibility that a false acceptance or rejection will occur. As a result, these types of biometric authentication technologies might be unsuitable for use in authenticating individuals of communal computing devices in environments having many users.

It is with respect to these and other technical challenges that the disclosure made herein is presented.

SUMMARY

In order to address the technical problems described above, and potentially others, the disclosed technologies enable authentication of users of communal computing devices using a limited search scope. Through implementations of the disclosed technologies, the FAR and FRR rates of biometric authentication on communal computing devices can be improved, particularly in environments having many users. Additionally, implementations of the disclosed technologies can reduce the utilization of computing resources, such as processor cycles and network bandwidth, by reducing the number of records that are searched to determine if a user is to be authenticated.

In order to achieve the technical benefits described above, and potentially others, a trust relationship is established between a communal computing device, such as an interactive digital whiteboard, and a trusted cloud-based provider, such as a centrally-managed identity service. A trust relationship is also established between a user's personal device, such as a smartphone, and the cloud-based provider. For instance, in an enterprise environment, a user's personal device may be registered on the same corporate network as the communal computing device in order to establish the trusted relationship.

As part of a registration process, a user might be asked to provide an identification (ID) signal, which can later be utilized, at least in part, to identify the user. For example, in some embodiments a biometric ID signal is obtained from the user, such as a self-snapshot, a fingerprint, or a recording of the user speaking. The ID signal may be stored by the cloud-based provider, such as in a user record associated with the user. Other types of ID signals can also be obtained and stored, such as a hardware identifier (ID) for the user's personal device.

When the user later attempts to authenticate with the communal computing device, the communal computing device can capture another ID signal for the user. For instance, the communal computing device might once again capture a biometric ID signal for the user, such as a photo of the user, a fingerprint, or audio of the user speaking. The communal computing device can then provide the captured ID signal to the cloud-based provider for use in authenticating the user of communal computing device.

In response to receiving a request to authenticate a user from the communal computing device, which might include the ID signal captured by the communal computing device, the cloud-based provider obtains a secondary ID signal associated with the user. The cloud-based provider can utilize the secondary ID signal, or a combination of secondary ID signals, to reduce the scope of the search that is performed to authenticate the user. For example, and as mentioned above, the cloud-based provider can store the ID signal provided by the user during registration (e.g. the self-snapshot) in or in association with a user record associated with the user. The cloud-based provider might store tens or hundreds of thousands of such records. Rather than searching all of the user records for a matching ID signal (e.g. a photo of a user's face), the cloud-based provider can search a subset of the user records that is selected based upon the secondary ID signal.

The secondary ID signal might, for example, be another biometric ID signal associated with the user. For example, and without limitation, the communal computing device might prompt the user to speak their name. The communal computing device can record the audio containing the user's name. The communal computing device, or another computing device, can perform speech recognition on the audio to recognize the user's name.

The cloud-based provider can then identify a subset of the user records to be searched based on the user's name. For instance, if the user's name is "Aria," then only user records for users named Aria will be searched for the ID signal provided by the user (e.g. the image of the user's face). In this way, the FAR and FRR can be improved while at the same time reducing the number of records searched by the cloud-based provider, thereby conserving computing resources and improving performance. Other types of biometric signals including, but not limited to, gestures, drawings, handwriting, fingerprints, and retina scans can be utilized as secondary ID signals in a similar fashion.

In some embodiments the secondary ID signal is generated by a personal device associated with a user. For instance, the secondary ID signal might be a signal indicating the location of the device (e.g. a GPS signal). In this example, the location of the personal device can be utilized to select a subset of records to be searched that includes only those users located in the vicinity of the communal computing device. As another example, the user might provide a fingerprint to the cloud-based provider by way of their personal device. The subset of records to be searched will then be selected that includes only those user records containing or referencing a matching fingerprint.

The secondary ID signal might also encompass data identifying users that have previously been successfully authenticated with the communal computing device. In this example, the search scope can be limited to those users that have previously authenticated with the communal computing device.

The secondary ID signal might also encompass calendar entries or other data describing an expected location of the user at a particular point in time. The secondary ID signal might indicate, for example, that a user is expected to participate in a meeting proximate to the communal computing device (e.g. in a conference room where the communal computing device is located) at a particular point in time. In this example, the search scope can be limited to those user records associated with users expected to be in the vicinity of the communal computing device at a particular point in time. The search scope can be limited further by searching only a record corresponding to the organizer of a meeting.

The particular secondary ID signal, or signals, utilized to narrow the search scope might change based upon various factors including, but not limited to, the time or date, the expected location of a user, the type of communal computing device or personal computing device utilized, and/or other factors. Other types of secondary ID signals can be utilized in other embodiments.

The cloud-based provider can authenticate the user based on the results of the search of the subset of the user records. For example, a user can be authenticated and authorized to use the communal computing device if the search of the subset of the user records identifies a user record containing or referencing a previously-stored ID signal (e.g. a photo) matching the ID signal (e.g. another photo) received from the communal computing device. The user will not be authenticated or authorized to use the communal computing device if the search of the subset of the user records does not identify a user record containing or referencing a previously-stored ID signal that matches the ID signal received from the communal computing device.

It should be appreciated that the above-described subject matter can be implemented as a computer-controlled apparatus, a computer-implemented method, a computing device, or as an article of manufacture such as a computer-readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

The following detailed description is directed to technologies for authentication of users of communal computing devices using a limited search scope. The disclosed technologies provide greater security by improving the FAR and FRR associated with biometric-based authentication. Additionally, implementations of the disclosed technologies can reduce the utilization of computing resources, such as processor cycles and network bandwidth, by reducing the number of records that are searched to determine if a user is to be authenticated. Other technical benefits not specifically mentioned herein can also be realized through implementations of the disclosed subject matter.

Figure 1:
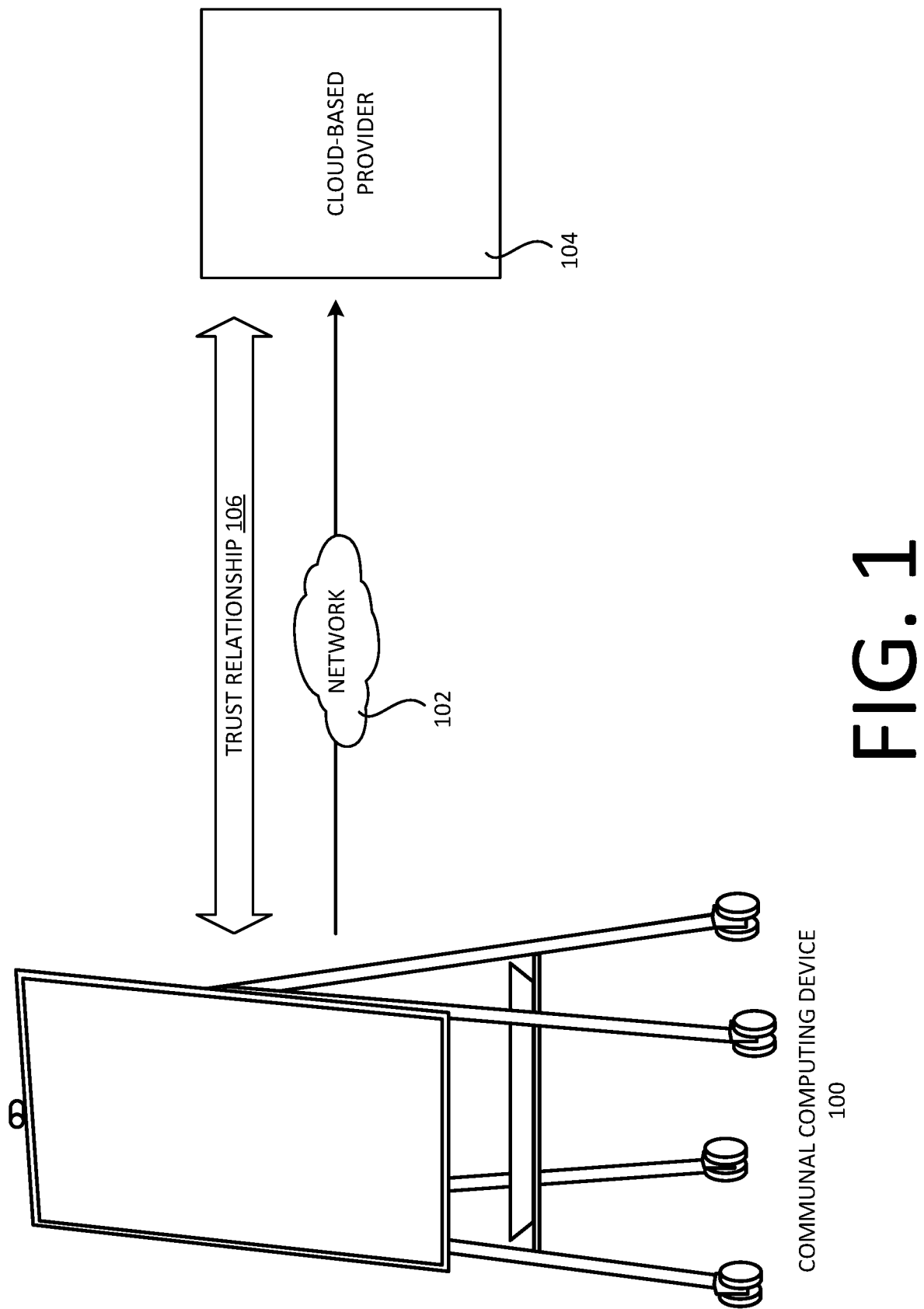
FIG. 1 is a diagram illustrating the establishment of a trust relationship between a communal computing device and a cloud-based provider.

FIG. 1 is a diagram illustrating the establishment of a trust relationship between a communal computing device 100 and a cloud-based provider 104. The communal computing device 100 may be any type of computing device that is used simultaneously by multiple users or use by different users at different times. Examples of communal computing devices 100 include, but are not limited to, interactive digital whiteboards, smart televisions, computer systems in vehicles such as automobiles, computers at public locations such as libraries, computers that are borrowed for limited times such as at a school or business setting, computers at a location that are shared by multiple users such as a reception desk, etc.

Interactive digital whiteboards include, for example, the SURFACE HUB and SURFACE HUB 2 by MICROSOFT CORPORATION.

The network 102 may be any type or combination of communications networks such as the Internet, a local area network, a wide area network, a peer-to-peer network, and may be implemented by any type of networking technology including wireless and wired networking technologies. The network 102 provides a communication path for data between the communal computing device 100 and the cloud-based provider 104.

In addition to other functionality described below, the cloud-based provider 104 shown in FIG. 1 is a source of trusted identities for devices and users. The cloud-based provider 104 includes one or more server computers or other physical or logical computing devices that are located at one or more physical locations. The cloud-based provider 104 may be implemented with redundant infrastructures so that if any server or other piece of hardware or equipment becomes non-functional, the role of that non-functional device is provided by a different device.

The cloud-based provider 104 provides services through "the cloud," which is via a network connection to the device(s) receiving the services. A trusted relationship 106 between the communal computing device 100 and the cloud-based provider 104 might be established if the cloud-based provider 104 can communicate securely with the device 100, for example, through the use of public/private key cryptography. The existence of a trust relationship allows the communal computing device 100 to rely on user identification and authentication determinations made by another computing device with which it shares the trust relationship.

The cloud-based provider 104 may be located remote from the communal computing device 100 so that it is isolated from physical security threats to the communal computing device 100. For example, the cloud-based provider 104 may be implemented as one or more network-accessible servers that can be accessed from any location connected to the network 102. One example of a cloud-based provider that manages trust relationships is the AZURE IDENTITY network service by MICROSOFT CORPORATION.

Figure 2:
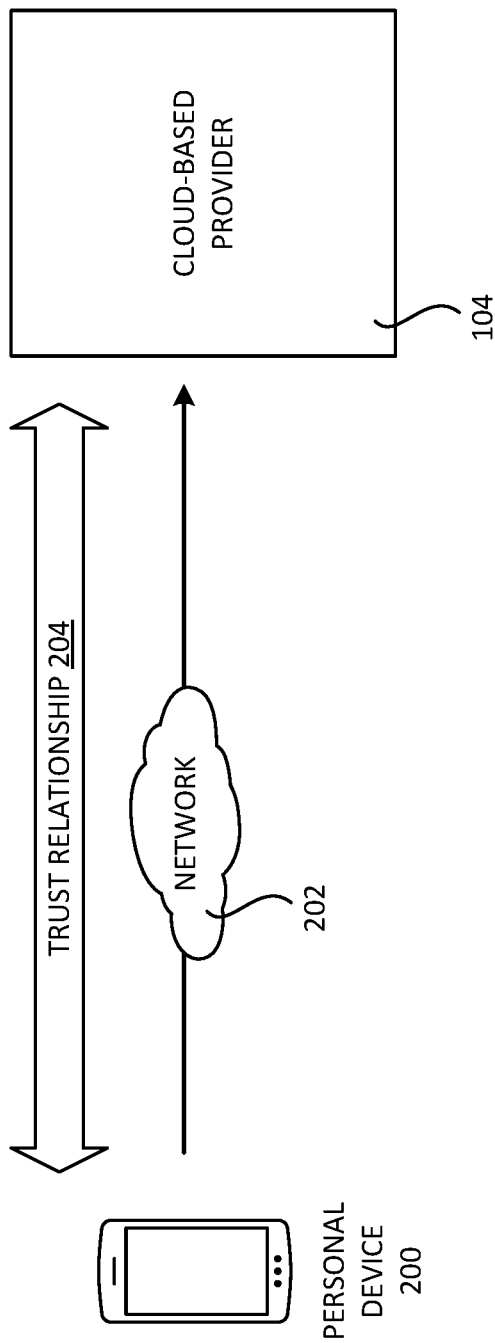
FIG. 2 is a diagram illustrating the establishment of a trust relationship between a personal device and a cloud-based provider.

FIG. 2 is a diagram illustrating the establishment of a trust relationship between a personal device 200 and a cloud-based provider 104. The personal device 200 is a device that is associated with and typically used only by a single user. Examples of personal devices 200 include, but are not limited to, smartphones, personal digital assistants, media players, tablet computers, and the like. Personal devices 200 may be implemented in any number of different form factors such as mobile devices, wearable devices, digital inking devices, implantable devices, etc. Personal devices 200 typically include at least basic computing capability and are equipped with one or more processors, one or more types of memory, and input/output devices as well as hardware that can implement network connectivity.

The trust relationship 204 can be a pre-established trust relationship based on enrollment or registration of the personal device 200 with the cloud-based provider 104. The trust relationship 204 between the personal device 200 and the cloud-based provider 104 may be the same as the trust relationship 106 between the communal computing device 100 and the cloud-based provider 104. Enrollment may include creating a biometric log in the personal device 200 such as by setting up a fingerprint reader or other sensor capable of capturing biometric information. The biometric data can be securely stored under the user's control on his or her personal device 200. Additionally, once the hardware on the personal device 200 is set up to accurately recognize the user's biometrics, the recognition by the personal device 200 may be used to access not only the personal device 200 but also the communal computing device 100 and other devices that also have a trust relationship with the cloud-based provider 104.

Creation of the trust relationship 204 might include communicating information about the personal device 200 to the cloud-based provider 104, such as a unique device identifier. The unique device identifier may be, for example, a hardware ID, a serial number, a phone number, etc. The trust relationship 204 may be implemented by establishing a secure communication channel between the personal device 200 and the cloud-based provider 104, such as through the use of public/private key encryption. Additionally, installation of a software token recognized by the cloud-based provider 104 on the personal device 200 may be part of creating the pre-established trust relationship.

The network 202 provides a communications link between the personal device 200 and the cloud-based provider 104. The network 202 may be implemented as any type or combinations of networks such as the Internet, a wireless cellular network, a wired telephone network, a peer-to-peer network, etc. The personal device 200 may have a wireless connection with the network 202 such as a connection communications protocol that uses radio frequencies such as wireless fidelity (WI-FI), BLUETOOTH, or another wireless communication technology. The network 202 may be the same or different than the network 102 introduce FIG. 1.

The cloud-based provider 104 shown in FIG. 2 is the same as the cloud-based provider 104 illustrated in FIG. 1. However, the communal computing device 100 and the personal device 200 may access different hardware or different physical servers that are both parts of the same cloud-based provider 104. Thus, even if the communal computing device 100 and the personal device 200 cannot directly communicate with each other because they use different networks, both are able to communicate with the cloud-based provider 104. The trust relationship 204 between the personal device 200 and the cloud-based provider 104 allows the cloud-based provider 104 to recognize and trust communications from the personal device 200. The personal device 200 may be identified as a member of the trust relationship 204 based on a characteristic of the personal device 200, such as a hardware ID and/or based on an identity of a user associated with the personal device 200.

Figure 3:
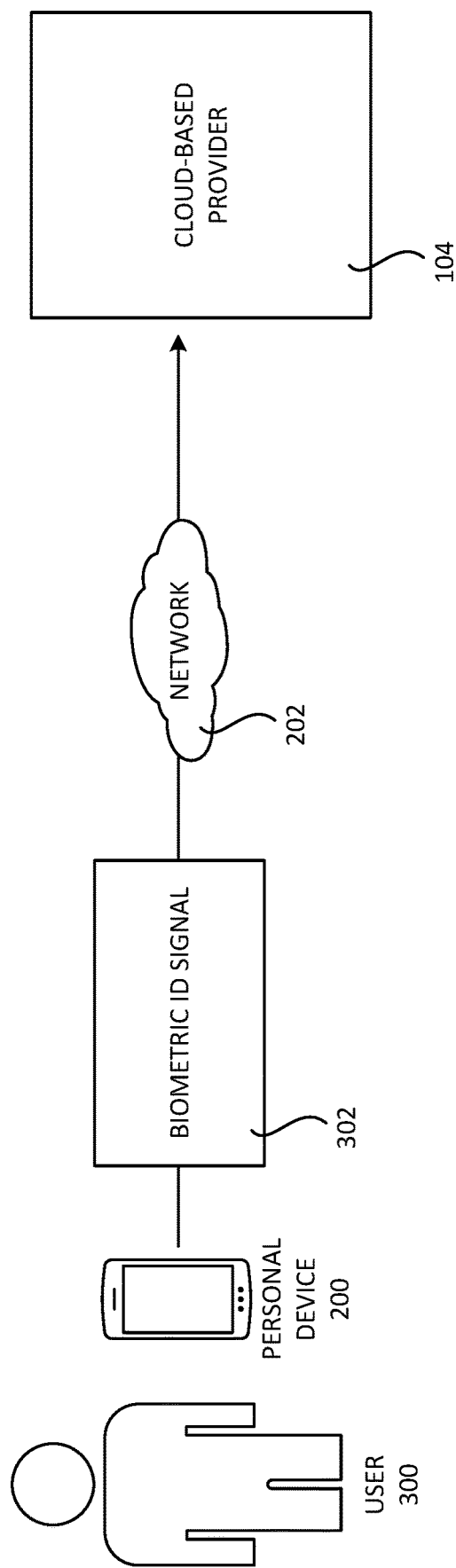
FIG. 3 is a diagram illustrating aspects of the registration of a user with a cloud-based provider, including the transmission of a biometric ID signal from a personal device to a cloud-based provider.

FIG. 3 is a diagram illustrating aspects of the registration of a user 300 with the cloud-based provider 104, including the transmission of a biometric ID signal 302 from a personal device 200 to the cloud-based provider 104. As described briefly above, a user 300 might be asked to provide an ID signal (i.e. a signal that identifies the user 300) as part of a process for registering the personal device 200 with the cloud-based provider 104. The provided ID signal can later be utilized, at least in part, to identify the user 300.

In some embodiments, the ID signal provided by the user 300 is a biometric ID signal 302. A biometric signal 302 is a distinct, measurable biological characteristic that can be used, at least in part, to identify a user 300. Biometric signals 302 include, but are not limited to, a digital photograph of a user's face such as a self-snapshot, a fingerprint, a recording of the user 300 speaking, a gesture, a drawing, or handwriting made with a finger or digital stylus, and a retina scan. In this regard, it is to be appreciated that while the embodiments described herein are primarily described in the context of a biometric ID signal 302, it is to be appreciated that other types of ID signals can be utilized in other configurations. For example, and without limitation, the ID signal might be a unique ID associated with the personal device 200.

The biometric ID signal 302 is obtained by the personal device 200 in the configuration illustrated in FIG. 3. However, and as will be described in greater detail below with regard to FIG. 4, the biometric ID signal 302 might be obtained by other computing devices, such as the communal computing device 100, in other configurations. The personal device 200 transmits the ID signal (e.g. the biometric ID signal 302) to the cloud-based provider 104. The cloud-based provider 104, in turn, stores the ID signal, such as in a user record associated with the user 300. As will be described in greater detail below, the cloud-based provider 104 can utilize the ID signal in conjunction with a secondary ID signal to authenticate the user 300.

Figure 4:
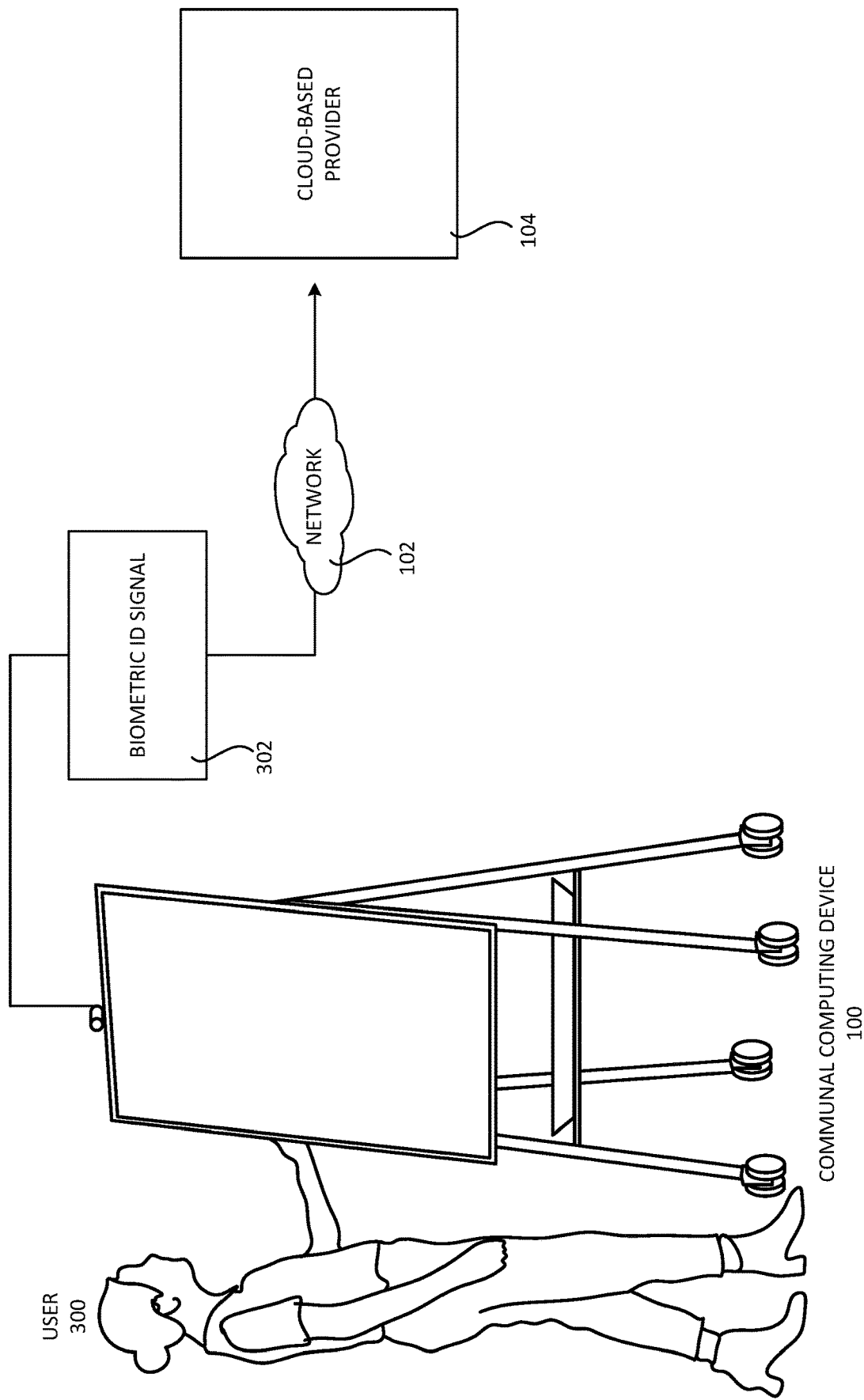
FIG. 4 is a diagram illustrating aspects of the registration of a user with a cloud-based provider, including the transmission of a biometric ID signal from a communal computing device to a cloud-based provider.

FIG. 4 is a diagram illustrating aspects of the registration of a user 300 with the cloud-based provider 104, including the transmission of a biometric ID signal 302 from the communal computing device 100 to the cloud-based provider 104. As described briefly above, the user 300 can register with the cloud-based provider 104 by providing an ID signal to the cloud-based provider 104 by way of the communal computing device 100. For example, and without limitation, a biometric ID signal 302 can be obtained by the communal computing device 100 and provided to the cloud-based provider 104 for storage and utilization in the manner described below.

As in the examples described above, the biometric ID signal 302 captured by the communal computing device 100 might include, but is not limited to, a digital photograph of a user's face such as a self-snapshot, a fingerprint, a recording of the user 300 speaking, a gesture, drawing, or handwriting made with a finger or digital stylus, and a retina scan. The communal computing device 100 can also capture other types of ID signals associated with the user 300 including, but not limited to, a signal indicating the presence or unique ID of the user's personal device 200. As will be described in greater detail below, the cloud-based provider 104 can utilize the ID signal (e.g. the biometric ID signal 302) in conjunction with a secondary ID signal to authenticate the user 300.

Figure 5:
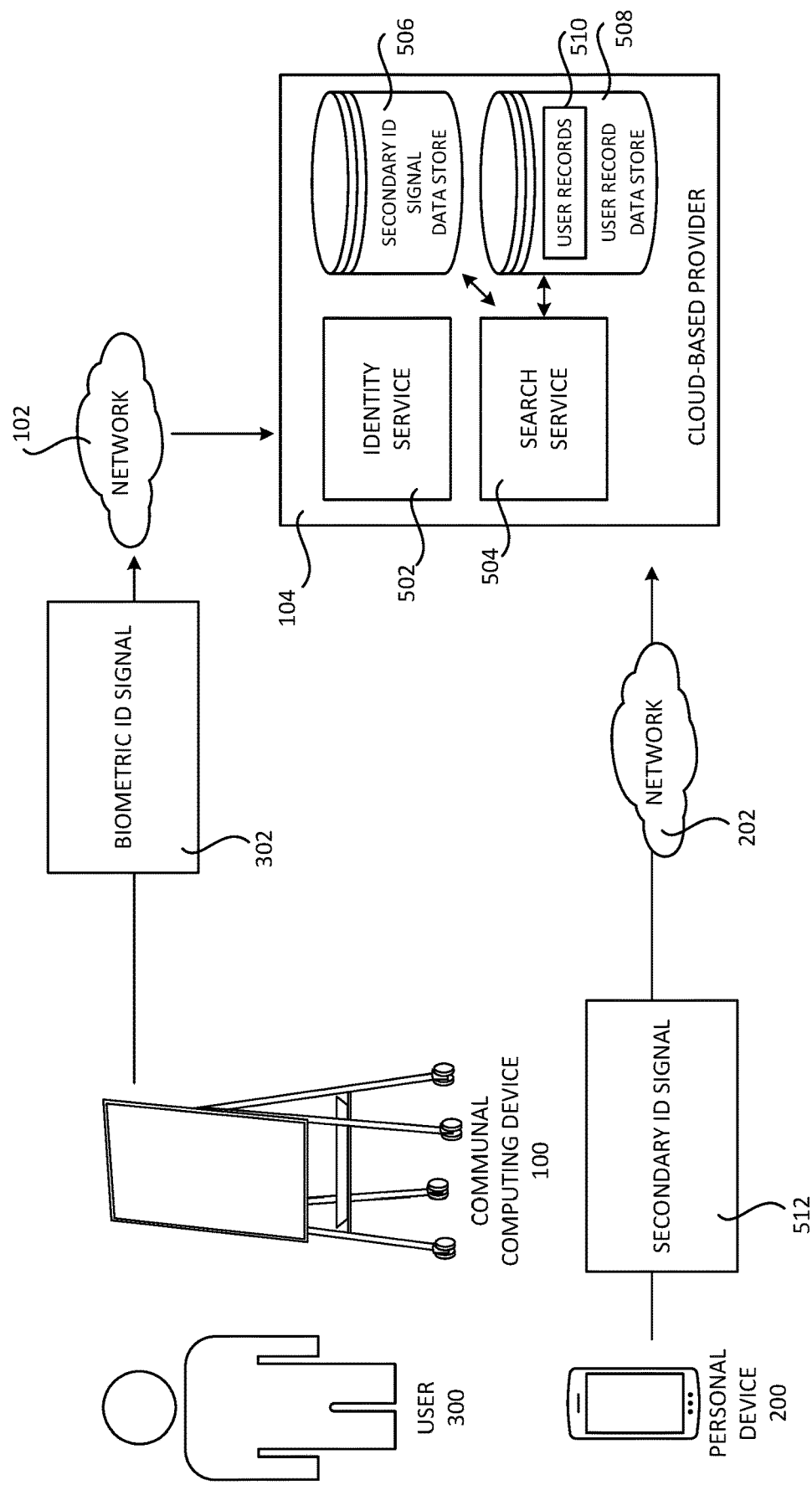
FIG. 5 is a diagram showing aspects of one mechanism disclosed herein for authenticating users of a communal computing device using a limited search scope.

FIG. 5 is a diagram showing aspects of one mechanism disclosed herein for authenticating users 300 of a communal computing device 100 using a limited search scope. As mentioned above, the embodiments disclosed herein operate in conjunction with a cloud-based provider 104. The cloud-based provider 104 may be implemented on one or more physical or logical computing devices located at a single site or distributed across multiple physically separate sites.

In one embodiment, the cloud-based provider 104 includes a centrally-managed identity service 502. Identity service 502 may maintain secure records of user and device identities that can be referenced to verify that a given user or device is, in fact, the user/device known to the identity service 502. The centrally-managed identity service 502 may be managed by a third party that is separate from the user 300 and owner of the communal computing device 100. For example, the centrally-managed identity service 502 may be a service that provides digital IDs or digital signature certificates. One example of the centrally-managed identity service 502 is the AZURE ACTIVE DIRECTORY service from MICROSOFT CORPORATION. The identity service 502 implements the functionality described below as being performed by the search service 504 in some embodiments.

As also illustrated in FIG. 5, the cloud-based provider 104 can include a search service 504. As will be described in greater detail below, the search service 504 is configured to authenticate users 300 of the communal computing device 100 using a limited search scope. In one embodiment, the search service 504 can identify a user 300 using a combination of ID signals, such as a biometric ID signal 302, and one or more secondary signals 512. The secondary ID signals are stored in a data store 506 accessible to the search service 504 in some embodiments.

As discussed above, the secondary ID signals 512 stored in the data store 506 can include, but are not limited to, biometric ID signals associated with a user 300, signals generated by a personal device 200 associated with a user, and other types of signals that the search service 504 can utilize to reduce search scope. For instance, the secondary ID signal 512 might be a signal indicating the location of the device 200 (e.g. a GPS signal), data identifying users 300 that have previously been successfully authenticated with the communal computing device 100, calendar entries or other data describing an expected location of the user 300 at a particular point in time. The particular secondary ID signal 512, or signals, utilized to narrow the search scope might change based upon various factors including, but not limited to, the time or date, the expected or current location of a user 300, the type of communal computing device 100 or personal computing device 200 utilized, and/or other factors. Other types of secondary ID signals 512 can be utilized in other embodiments.

The secondary ID signals 512 can also be stored in association with user records 510 that are stored in a data store 508 accessible to the search service 504 in one embodiment. The user records 510 can include information about a user 300 including, but not limited to, the user's name, contact information, department, and location. The user records 510 can also include or reference authorization data describing the rights of the user 300 to access and utilize computing resources and devices, such as the communal computing device 100. The user records 510 can also reference or include the secondary ID signal 512, or signals, associated with each user 300. The user records 510 can also be generated and maintained by the identity service 502 in some embodiments.

As described briefly above, a user 300 may be detected in the proximity of the communal computing device 100 by a sensor on the communal computing device 100, such as a camera or microphone. The user 300 may be determined to be "proximate" to the communal computing device 100 when the user 300 is within a threshold distance such as one meter, two meters, three meters etc. Proximity may also be based on the detection threshold of a sensor used to detect the user 300. For example, the user 300 may be considered "proximate" to the communal computing device 100 when the user is close enough that a camera on the communal computing device 100 can form an image of the face of the user 300. Thus, the communal computing device 100 may detect the presence of the user 300 without any direct user interaction.

When the user 300 is detected in proximity of the communal computing device 100 by a sensor or wireless communications interface on the communal computing device 100, an ID signal, such as the biometric ID signal 302, can be captured and transmitted from the communal computing device 100 to the cloud-based provider 104. As discussed above, the biometric ID signal 302 might be a digital photograph of the user's face such as a self-snapshot, a fingerprint, a recording of the user 300 speaking, a gesture, drawing, or handwriting made with a finger or digital stylus, or a retina scan. The cloud-based provider 104 can utilize the captured ID signal to authenticate the user 300 of communal computing device 100 in the manner described below.

In response to receiving a request to authenticate the user 300 from the communal computing device 100, which might include the ID signal (e.g. the biometric ID signal 302) captured by the communal computing device 100, the cloud-based provider 104 obtains a secondary ID signal 200 associated with the user 300. As discussed in greater detail below, the cloud-based provider 104 can utilize the secondary ID signal 512, or a combination of secondary ID signals 512, to reduce the scope of the search that is performed to authenticate the user 300. For example, and as mentioned above, the cloud-based provider 104 can store the ID signal provided by the user 300 during registration (e.g. the self-snapshot) in or in association with a user record 510 associated with the user. The cloud-based provider 104 might store tens or hundreds of thousands of such records. Rather than searching all of the user records 510 for a matching ID signal (e.g. a photo of a user's face), the cloud-based provider 104 can search a subset of the user records 510 that is selected based upon the secondary ID signal 512, or signals.

As discussed above, the secondary ID 512 signal might, for example, be another biometric ID signal 302 associated with the user 300. For example, and without limitation, the communal computing device 100 or the user's personal device 200 might prompt the user 300 to speak their name. The communal computing device 100 or personal device 200 can record the audio containing the user's name. The communal computing device, the personal device 200, or another computing device, can perform speech recognition on the audio to recognize the user's name.

The cloud-based provider 104 can then identify a subset of the user records 510 to be searched based on the secondary ID signal 412, the user's name in this example. For instance, if the user's name is "Aria," then only user records 510 for users named Aria will be searched for the biometric ID signal 302 provided by the user (e.g. the image of the user's face). In this way, the FAR and FRR can be improved, while at the same time reducing the number of records 510 searched by the cloud-based provider 104, thereby conserving computing resources and improving performance. Other types of biometric ID signals 302 including, but not limited to, gestures, drawings, handwriting, fingerprints, and retina scans can be utilized as secondary ID signals 512 in a similar fashion.

In some embodiments the secondary ID signal 512 is generated by a personal device 200 associated with the user 300. For instance, the secondary ID signal 512 might be a signal indicating the location of the device 200 (e.g. a GPS signal). In this example, the location of the personal device 200 can be utilized to select a subset of user records 510 to be searched that includes only those users located in the vicinity of the communal computing device 100. In a similar example, the search scope might be limited to those users located in the same building or facility as the communal computing device 100.

As mentioned briefly above, the secondary ID signal 506 stored by the cloud-based provider 104 might also encompass data identifying users that have previously been successfully authenticated with the communal computing device 100. In this example, the search scope can be limited to those users that have previously authenticated with the communal computing device 100.

The secondary ID signal 506 might also be a gesture made with a digital stylus or using a touchscreen. For example, and without limitation, the user 300 might be asked to swipe left or right during registration with a digital stylus or their finger. This gesture can be utilized to narrow the search scope in half since approximately one-half of the users will presumably swipe left and the other half of the users will swipe right. Other types of gestures, drawings, and handwriting characteristics can be utilized in a similar fashion.

The secondary ID signal stored by the cloud-based provider 104 might also encompass calendar entries or other data describing an expected location of the user 300 at a particular point in time. The secondary ID signal might indicate, for example, that the user 300 is expected to participate in a meeting proximate to the communal computing device 100 (e.g. in a conference room where the communal computing device 100 is located) at a particular point in time. In this example, the search scope can be limited to those user records 510 associated with users expected to be in the vicinity of the communal computing device 100 at the time the search is performed. In some embodiments, the search scope can be limited even further by limiting the search to a user record 510 associated with an organizer of a meeting.

As also discussed briefly above, the particular secondary ID signal 512, or signals, that are utilized to narrow the search scope might change based upon various factors including, but not limited to, the time or date, the expected location of a user, the type of communal computing device 100 or personal computing device 200 utilized, and/or other factors. Other types of secondary ID signals 512 can be utilized in other embodiments.

The cloud-based provider 104 (e.g. the identity service 502) can authenticate the user 300 based on the results of the search of the subset of the user records 510. For example, a user 300 can be authenticated and authorized to use the communal computing device 100 if the search of the subset of the user records 510 identifies a user record containing or referencing a previously-stored ID signal (e.g. a self-snapshot stored at registration time) matching the ID signal (e.g. the biometric ID signal 302) received from the communal computing device 100. The user 300 will not be authenticated or authorized to use the communal computing device 100 if the search of the subset of the user records 510 does not identify a user record containing a previously-stored ID signal that matches the ID signal received from the communal computing device 100.

Figure 6:
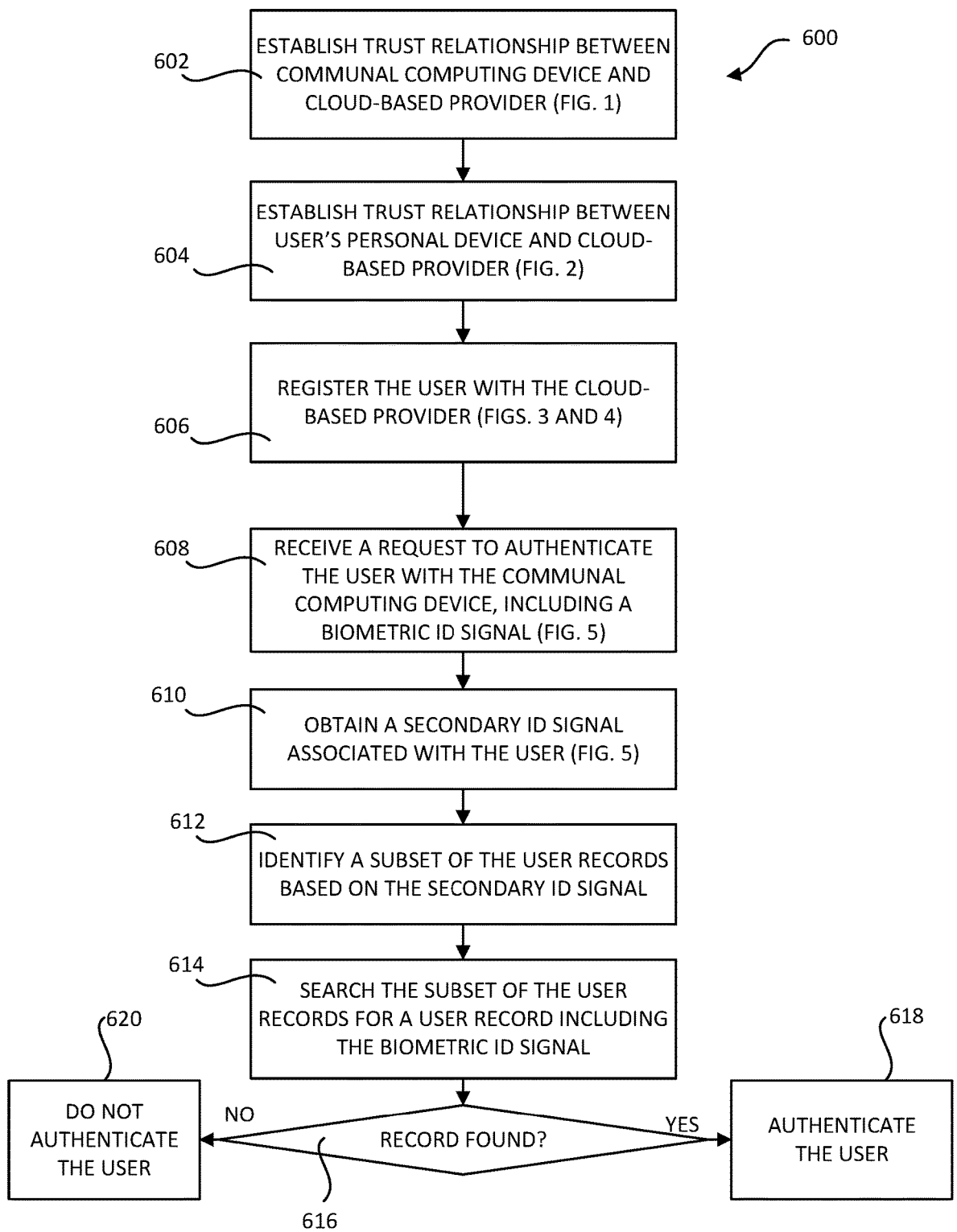
FIG. 6 is an illustrative flow diagram showing a process for authenticating users of a communal computing device using a limited search scope.

FIG. 6 is an illustrative flow diagram showing a process for authenticating users of a communal computing device 100 using a limited search scope. It should be appreciated that the logical operations described herein with regard to the FIGS., including the flow diagram shown in FIG. 6, can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

At 602, a trust relationship is established between the communal computing device 100 and the cloud-based provider 104. This may be implemented as the trust relationship shown in FIG. 1 and described above. This trust relationship may, for example, share user identification and user authentication data between the communal computing device 100 and the cloud-based provider 104. As discussed above, the communal computing device 100 may be an interactive digital whiteboard in some implementations. The cloud-based provider 104 may include the data and functionality illustrated in FIG. 4. For example, the cloud-based provider 104 may include an identity service 502 that maintains the identity of the user 300 and authenticates the user 300.

At 604, a trust relationship established between the personal device 200 and the cloud-based provider 104. This may be implemented as the trust relationship shown in FIG. 2 and described above. This trust relationship may be pre-established prior to the user 300 beginning interaction with the communal computing device 100, such as during registration of the user with the cloud-based provider 104. The personal device 200 may be a smartphone in some implementations. Similar to the trust relationship with the communal computing device 100, the trust relationship between the personal device 200 and the cloud-based provider 104 may enable sharing of user identification and user authentication data, such as secondary ID signals 512.

At 606, the user 300 is registered with the cloud-based provider 104. For example, and without limitation, the user 300 might register with the cloud-based provider 104 using their personal device 200, the communal computing device 100, or another device. As a part of the registration process, the user 300 might provide an ID signal, such as the biometric ID signal 302 shown in FIGS. 4 and 5 and described above. The user 300 can provide other types of information during the registration process in other embodiments. The ID signal and other information collected during registration are stored by the cloud-based provider 104 in or in conjunction with a user record 510 in some embodiments.

At 608, the cloud-based provider 104 (e.g. the identity service 502) receives a request to authenticate a user 300 from the communal computing device 100. The request can include an ID signal, such as a biometric ID signal like a picture of the user's face obtained by an imaging sensor in the communal computing device 100.

At 610, the cloud-based provider 104 obtains a secondary ID signal 512, or signals, associated with the user 300 requesting authentication. As discussed above, the secondary ID signal 512 might be obtained by the communal computing device 100, the personal device 200, or might have been previously stored by the cloud-based provider 104, such as during registration of the user 300.

At 612, the cloud-based provider 104 identifies a subset of the user record 510 to be searched using the secondary ID signal 512, or signals. Multiple examples of reducing the search scope using the secondary ID signal 512, or signals, were provided above. In this regard, it is to be appreciated that these examples are merely illustrative and that the search scope can be narrowed using one or more secondary ID signals 512 in other ways in other embodiments.

At 614, the subset of user records 510 identified at 612 are searched for a user record that includes the ID signal (e.g. the biometric ID signal) received from the communal computing device at 608. For example, the subset of the user records 510 might be searched for a previously-stored photo of the user 300 that matches the photo of the user generated by the communal computing device 100 and provided with the authentication request.

At 616, the cloud-based provider 104 determines if the search performed at 614 located a matching user record 510. If so, the routine 600 proceeds to 618, where the user is authenticated and permitted to utilize the communal computing device 100. If not, the routine 600 proceeds to 620, where the user is not authenticated. If the user 300 is not authenticated, the user 300 might not be permitted to utilize the communal computing device 100 or might be permitted to utilize only a restricted set of functionality of the device 100.

Figure 7:
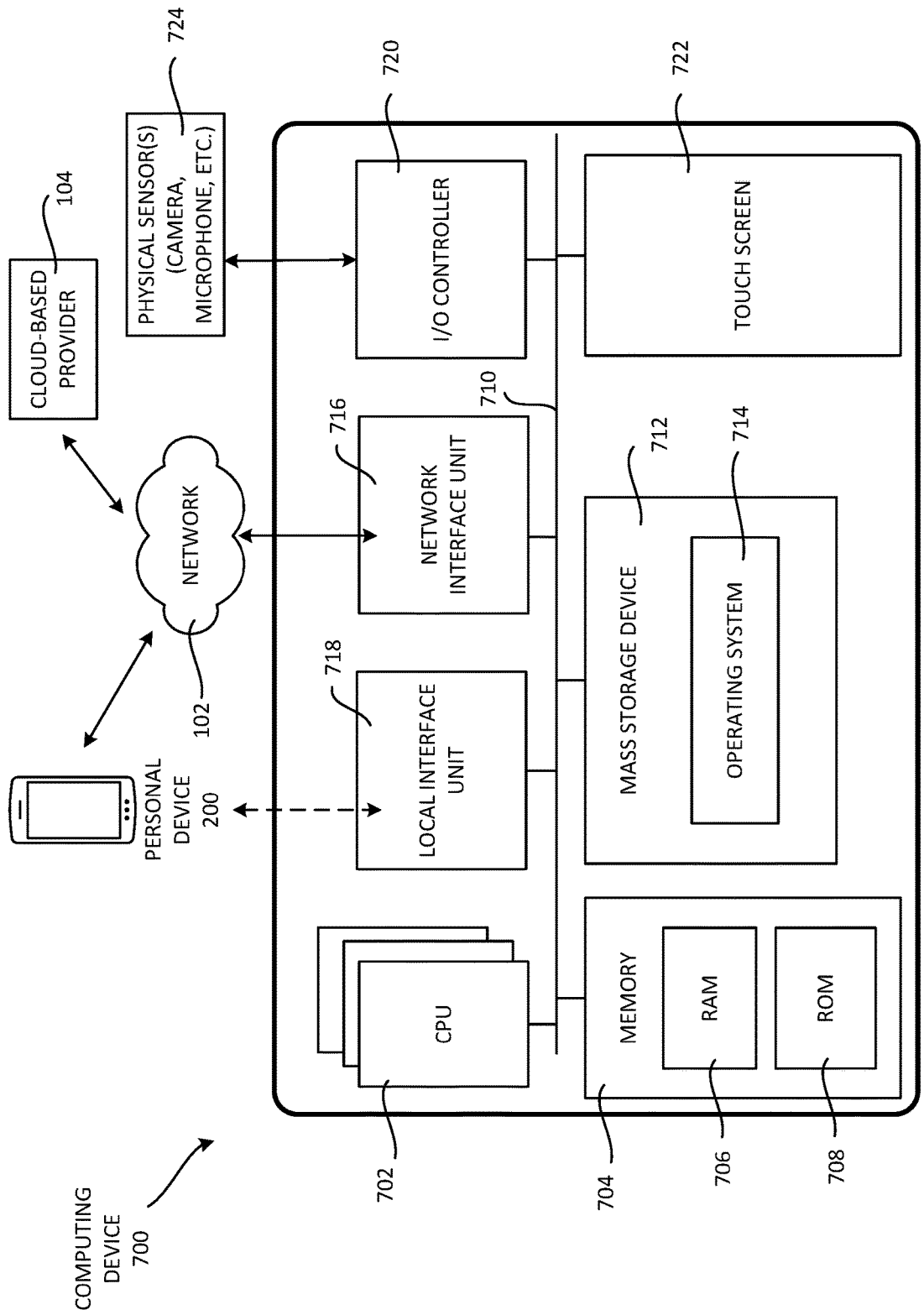
FIG. 7 is a computer architecture diagram and network diagram showing an illustrative computer hardware and software architecture for a communal computing device.

FIG. 7 is a computer architecture diagram showing an illustrative computer hardware and software architecture for a computing device 700 that can implement the various technologies presented herein. In particular, the architecture illustrated in FIG. 7 can be utilized to implement a communal computing device 100 such as an interactive digital whiteboard, shared kiosk, smart television, in-car computer, desktop or laptop computer, or another type of communal computing device. The disclosed architecture can also be utilized to implement the other computing devices disclosed herein including, but not limited to, the personal device 200 and computing systems for implementing the cloud-based provider 104.

The computing device 700 illustrated in FIG. 7 includes one or more central processing unit(s) (CPU) 702, one or more instances of system memory 704, which may include a random-access memory 706 (RAM) and a read-only memory (ROM) 708. A system bus 710 may function to couple the system memory 704 to the CPU 702 and connect both to other components of the computing device 700. However, the computing device 700 may also be implemented in an architecture that does not include a system bus 710. A basic input/output system ("BIOS" or "firmware") containing the basic routines that help to transfer information between elements within the computing device 700, such as during startup, can be stored in the ROM 708. The computing device 700 further includes a mass storage device 712 for storing an operating system 714, application programs and other types of programs. The mass storage device 712 can also be configured to store other types of programs and data.

The mass storage device 712 may be connected to the CPU 702 through a mass storage controller (not shown) connected to the system bus 710. The mass storage device 712 and its associated computer-readable media provide non-volatile storage for the computing device 700. Although the description of computer-readable media contained herein refers to a mass storage device 712, such as a hard disk, CD-ROM drive, DVD-ROM drive, or USB storage key, it should be appreciated by those skilled in the art that computer-readable media can be any available computer-readable storage media or communication media that can be accessed by the computing device 700.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media can include volatile and non-volatile, removable and non-removable media implemented in any method or technology for storage of information such as computer-readable instructions, data structures, program modules or other data. For example, computer storage media includes, but is not limited to, RAM 706, ROM 708, EPROM, EEPROM, flash memory or other solid-state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computing device 700. For purposes of the claims, the phrase "computer-readable storage medium," and variations thereof, does not include waves or signals per se or communication media. Thus, computer-readable storage media and communication media are mutually exclusive.

According to various configurations, the computing device 700 can operate in a networked environment using logical connections to remote computers through a network such as the network 102. The computing device 700 can connect to the network 102 through a network interface unit 716 connected to the system bus 710. It should be appreciated that the network interface unit 716 can also be utilized to connect to other types of networks and remote computer systems such as the personal device 200 and the cloud-based provider 104. The computing device 700 can also include a local interface unit 718 to establish communicative connections with local devices, such as through a wired or wireless connection. For example, local interface unit 718 can connect the computing device 700 via a cable, such as a USB cable, to another device such as a biometric reader, a video camera, etc. Wireless connections such as BLUETOOTH, infrared, etc. may also be implemented through the local interface unit 718 such as, for example, a wireless connection to the personal device 200.

The computing device 700 may also include an input/output (I/O) controller 720 for receiving and processing input from a number of other devices, including a keyboard, mouse, touchscreen 722, an electronic stylus, or physical sensor(s) such as a video camera, microphone array, or fingerprint reader. Similarly, the I/O controller 720 can provide output to a display screen, a touchscreen 722, or other type of output device such as a speaker.

It should be appreciated that the software components described herein, when loaded into the CPU 702 and executed, can transform the CPU 702 and the overall computing device 700 from a general-purpose computing device into a special-purpose computing device customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein can also transform the physical structure of the computer-readable media presented herein. The specific transformation of the physical structure depends on various factors, in different implementations of this description. Examples of such factors include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

The computing device 700 may also include one or more physical sensor(s) 724 such as a camera, a video camera, a microphone array, etc. that capture data from the environment proximate to the computing device 700. A video camera may be used by the computing device 700 to recognize people in front of the device and for video conferencing. Recognizing people in front of the device may allow for the computing device 700 in conjunction with the cloud-based provider 104 to identify individual and authenticate users in the manner described above. The physical sensor(s) 724 may be integrated into the computing device 700 or they may be accessories attached to the computing device 700. Sensor data generated by the physical sensor(s) 724 may be provided to other components of the computing device 700 via the I/O controller 720.

In light of the above, it should be appreciated that the computing device 700 may implement aspects of the technologies and techniques discussed above and shown in FIGS. 1-6 using the operative system 714 and/or other executable components. For example, the computing device 700 can establish a trust relationship with the cloud-based provider 104, which may be implemented in part by an encrypted data connection via the network 102. The operating system 714 or other software may also function to utilize authentication and identification information provided by the cloud-based provider 104.

The local interface unit 718 may, additionally or alternatively, detect a signal from the personal device 200, or another device, in proximity to the computing device 700. The signal may be sent via radio waves such as by BLUETOOTH, by light such as an infrared signal, or with a different technology. The signal may contain a unique identifier for the device such as a hardware ID, phone number, etc.

The computing device 700 may include in the mass storage device 712 or elsewhere computer-executable instructions which, when executed by the CPU 702 or other processor(s) cause the computing device 700 to implement technologies and processes discussed above. For example, the instructions may cause the computing device 700 to establish a trust relationship with the centrally-managed identity service that is part of the cloud-based provider 104. The computing device 700 might also detect the presence of a person in proximity to the communal computing device 100 using one or more sensors such as the physical sensor(s) 724 and or one or more wireless communication connections such as a wireless connection implemented by the local interface unit 718. It is also contemplated that the computing device 700 might not include all of the components shown in FIG. 7, can include other components that are not explicitly shown in FIG. 7, or can utilize an architecture different than that shown in FIG. 7.

ILLUSTRATIVE EMBODIMENTS

The following clauses described multiple possible embodiments for implementing the features described in this disclosure. The various embodiments described herein are not limiting nor is every feature from any given embodiment required to be present in another embodiment. Any two or more of the embodiments may be combined together unless the context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

The disclosure presented herein also encompasses the subject matter set forth in the following clauses:

Clause 1. A computer-implemented method for authenticating a user of a communal computing device, the method comprising: obtaining a first identification (ID) signal for the user from the communal computing device; obtaining a secondary ID signal associated with the user; identifying a subset of a set of user records based on the secondary ID signal; searching the subset of the user records for a user record containing or referencing the first ID signal; and authenticating the user of the communal computing device based upon results of the search of the subset of the user records.

Clause 2. The computer-implemented method of clause 1, wherein the first ID signal comprises a biometric identification signal.

Clause 3. The computer-implemented method of clause 1 or 2, wherein the secondary ID signal comprises a biometric identification signal.

Clause 4. The computer-implemented method of any of clauses 1-3, wherein the secondary ID signal comprises a signal received from a device associated with the user.

Clause 5. The computer-implemented method of any of clauses 1-4, wherein the secondary ID signal comprises data identifying a plurality of users that have previously authenticated with the device.

Clause 6. The computer-implemented method of any of clauses 1-5, wherein a trust relationship exists between the communal computing device and a cloud-based provider, and wherein the cloud-based provider is configured to perform the operations for obtaining the first ID signal, obtaining the secondary ID signal, identifying the subset of the user records, searching the subset of the user records, and authenticating the user based upon the results of the search.

Clause 7. The computer-implemented method of any of clauses 1-6, wherein a trust relationship exists between a personal device associated with the user and a cloud-based provider.

Clause 8. A computing device, comprising: one or more processors; at least one computer-readable medium having computer executable instructions stored thereon which, when executed by the one or more processors, cause the computing device to: obtain a first identification (ID) signal for a user from a communal computing device; obtain a secondary ID signal associated with the user; identify a subset of a set of user records based on the secondary ID signal; search the subset of the user records for a user record associated with the first ID signal; and authenticate the user based upon results of the search of the subset of the user records.

Clause 9. The computing device of clause 8, wherein the first ID signal comprises a biometric identification signal.

Clause 10. The computing device of clauses 8 or 9, wherein the secondary ID signal comprises a biometric identification signal.

Clause 11. The computing device of any of clauses 8-10, wherein the secondary ID signal comprises a signal received from a device associated with the user.

Clause 12. The computing device of any of clauses 8-11, wherein the secondary ID signal comprises data identifying a plurality of users that have previously authenticated with the device.

Clause 13. The computing device of any of clauses 8-12, wherein a trust relationship exists between the communal computing device and a cloud-based provider, and wherein the cloud-based provider is configured to perform the operations for obtaining the first ID signal, obtaining the secondary ID signal, identifying the subset of the user records, searching the subset of the user records, and authenticating the user based upon the results of the search.

Clause 14. The computing device of any of clauses 8-13, wherein a trust relationship exists between a personal device associated with the user and a cloud-based provider.

Clause 15. The computing device of any of clauses 8-14, wherein the second signal comprises data identifying an expected location of the user.

Clause 16. At least one computer-readable storage medium having computer executable instructions stored thereon which, when executed by one or more processors, cause a computing device to: obtain a first identification (ID) signal for a user from a communal computing device; obtain a secondary ID signal associated with the user; identify a subset of a set of user records based on the secondary ID signal; search the subset of the user records for a user record containing the first ID signal; and authenticate the user based upon results of the search of the subset of the user records.

Clause 17. The at least one computer-readable storage medium of clause 16, wherein the first ID signal comprises a biometric identification signal and wherein the secondary ID signal comprises a biometric identification signal.

Clause 18. The at least one computer-readable storage medium of clauses 16 or 17, wherein the secondary ID signal comprises a signal received from a device associated with the user.

Clause 19. The at least one computer-readable storage medium of any of clauses 16-18, wherein a trust relationship exists between the communal computing device and a cloud-based provider, and wherein the cloud-based provider is configured to perform the operations for obtaining the first ID signal, obtaining the secondary ID signal, identifying the subset of the user records, searching the subset of the user records, and authenticating the user based upon the results of the search.

Clause 20. The at least one computer-readable storage medium of any of clauses 16-19, wherein a trust relationship exists between a personal device associated with the user and a cloud-based provider.

CONCLUSION

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

What is claimed is:

1. A computer-implemented method for authenticating a user to use a communal computing device, the method comprising:
receiving a request from the communal computing device to authenticate the user to use the communal computing device, the request comprising a first identification (ID) signal for the user generated by the communal computing device; and
responsive to receiving the request from the communal computing device to authenticate the user to use the communal computing device,
obtaining a secondary ID signal associated with the user,
selecting a subset of a set of user records to be searched to determine if the user can be authenticated to use the communal computing device based on the secondary ID signal,
searching the selected subset of the user records for a user record containing or referencing a previously-stored ID signal that matches the first ID signal generated by the communal computing device,
authenticating the user to use the communal computing device if the search of the selected subset of the user records locates a user record containing or referencing a previously-stored ID signal that matches the first ID signal generated by the communal computing device, and
not permitting the user to use the communal computing device if the search of the selected subset of the user records does not locate a user record containing or referencing a previously-stored ID signal that matches the first ID signal generated by the communal computing device.

2. The computer-implemented method of claim 1, wherein the first ID signal comprises a biometric identification signal.

3. The computer-implemented method of claim 1, wherein the secondary ID signal comprises a biometric identification signal.

4. The computer-implemented method of claim 1, wherein the secondary ID signal comprises a signal received from a device associated with the user.

5. The computer-implemented method of claim 1, wherein the secondary ID signal comprises data identifying a plurality of users that have previously authenticated with the communal computing device.

6. The computer-implemented method of claim 1, wherein a trust relationship exists between the communal computing device and a cloud-based provider, and wherein the cloud-based provider is configured to perform the operations for obtaining the first ID signal, obtaining the secondary ID signal, identifying the subset of the user records, searching the subset of the user records, and authenticating the user based upon the results of the search.

7. The computer-implemented method of claim 6, wherein a trust relationship exists between a personal device associated with the user and the cloud-based provider and wherein the secondary ID signal comprises a signal received from the personal device.

8. A computing device, comprising:
one or more processors;
at least one computer-readable medium having computer executable instructions stored thereon which, when executed by the one or more processors, cause the computing device to:
receive a request from a communal computing device to authenticate a user to use the communal computing device, the request comprising a first identification (ID) signal for a user generated by the communal computing device; and
responsive to the request from the communal computing device to authenticate the user to use the communal computing device,
obtain a secondary ID signal associated with the user,
select a subset of a set of user records to be searched to determine if the user can be authenticated to use the communal computing device based on the secondary ID signal, search the selected subset of the user records for a user record associated with a previously-stored ID signal that matches the first ID signal generated by the communal computing device, authenticate the user to use the communal computing device if the search of the selected subset of the user records locates a user record associated with a previously-stored ID signal that matches the first ID signal generated by the communal computing device, and not permitting the user to use the communal computing device if the search of the selected subset of the user records does not locate a user record containing or referencing a previously-stored ID signal that matches the first ID signal generated by the communal computing device.

9. The computing device of claim 8, wherein the first ID signal comprises a biometric identification signal.

10. The computing device of claim 8, wherein the secondary ID signal comprises a biometric identification signal.

11. The computing device of claim 8, wherein the secondary ID signal comprises a signal received from a device associated with the user.

12. The computing device of claim 8, wherein the secondary ID signal comprises data identifying a plurality of users that have previously authenticated with the communal computing device.

13. The computing device of claim 8, wherein a trust relationship exists between the communal computing device and a cloud-based provider, and wherein the cloud-based provider is configured to perform the operations for obtaining the first ID signal, obtaining the secondary ID signal, identifying the subset of the user records, searching the subset of the user records, and authenticating the user based upon the results of the search.

14. The computing device of claim 13, wherein a trust relationship exists between a personal device associated with the user and the cloud-based provider and wherein the secondary ID signal comprises a signal received from the personal device.

15. The computing device of claim 8, wherein the second signal comprises data identifying an expected location of the user.

16. At least one computer-readable storage medium having computer executable instructions stored thereon which, when executed by one or more processors, cause a computing device to:

receive a request from a communal computing device to authenticate a user to use the communal computing device, the request comprising a first identification (ID) signal for a user generated by the communal computing device; and responsive to the request from the communal computing device to authenticate the user to use the communal computing device, obtain a secondary ID signal associated with the user, select a subset of a set of user records to be searched to determine if the user can be authenticated to use the communal computing device based on the secondary ID signal, search the selected subset of the user records for a user record containing a previously-stored ID signal that matches the first ID signal generated by the communal computing device, authenticate the user to use the communal computing device if the search of the selected subset of the user records locates a user record containing a previously-stored ID signal that matches the first ID signal generated by the communal computing device, and not permitting the user to use the communal computing device if the search of the selected subset of the user records does not locate a user record containing a previously-stored ID signal that matches the first ID signal generated by the communal computing device.

17. The at least one computer-readable storage medium of claim 16, wherein the first ID signal comprises a biometric identification signal and wherein the secondary ID signal comprises a biometric identification signal.

18. The at least one computer-readable storage medium of claim 16, wherein the secondary ID signal comprises a signal received from a device associated with the user.

19. The at least one computer-readable storage medium of claim 16, wherein a trust relationship exists between the communal computing device and a cloud-based provider, and wherein the cloud-based provider is configured to perform the operations for obtaining the first ID signal, obtaining the secondary ID signal, identifying the subset of the user records, searching the subset of the user records, and authenticating the user based upon the results of the search.

20. The at least one computer-readable storage medium of claim 19, wherein a trust relationship exists between a personal device associated with the user and the cloud-based provider and wherein the secondary ID signal comprises a signal received from the personal device.

* * * * *